Patented Aug. 10, 1943

2,326,578

UNITED STATES PATENT OFFICE 2,326,578

THERAPEUTIC PRODUCT AND PROCESS OF MAKING IT

Urbain J. Thuau, Paris, France, assignor to Eli Lilly and Company, Indianapolis, Ind., a corporation of Indiana No Drawing. Application November 22, 1939, Serial No. 305,655. In France August 31, 1939

14 Claims. (Cl. 260—512)

My invention relates to certain therapeutically effective, water-soluble, colloidal organic condensation products of relatively high molecular weight, which contain sulfonated metacresol groups joined together through condensation with an aldehyde; to a process of producing them; and to their use as medicaments to promote healing of diseased tissue, as for example in the treatment of cervicitis.

While I am not the first to react sulfonated cresols with an aldehyde to produce condensation products, I believe that I am the first to discover this medicinal use for a product of this type, and the first to produce such a product which is suitable for that medicinal use, and the first to modify the composition of known products of this general type in such a way that they become suitable for medicinal use, and the first to produce such a product when the cresol is definitely metacresol, and the first to manufacture such a product from which non-colloidal constituents, such as free sulfuric acid and uncombined m-cresol, are eliminated either wholly or for the greater part in order that the product may be employed for therapeutic purposes.

The products embodying my invention are strongly ionized in aqueous solutions, and those aqueous solutions react in a manner which indicates that such products are of a colloidal nature. The colloidal particles in solutions of these products bear electronegative charges, for in such solutions it is the anion which by virtue of its dimensions produces the colloidal characteristic.

On account of their chemical constitution, as a result of this derivation from only metacresolsulfonic acid, and of the fact that the impurities and the non-colloidal constituents of low molecular weight are eliminated from the said products thus providing products which are homogeneous from the point of view of electric charges apparent in aqueous solution, in conjunction with their high solubility in water and their colloidal nature in aqueous solution, I have found that the products to which the present invention is directed have considerable therapeutic value, which renders their use as pharmaceutical products very advantageous, either alone or in combination with known pharmaceutical products.

In carrying out my invention, I condense, through an aldehyde, metacresolsulfonic acid in substantially pure state, in such a way that the product contains a highly condensed portion present in amount not less than 1.5 times that of the portion of lower degree of condensation and therefore of lower molecular weight. In other words, the reaction is so carried out that the m-cresol sulfonic acid enters into reaction with the aldehyde to form a product containing at least 60%, and preferably about 75%, of complexes of sufficiently high molecular weight to react with protein to form insoluble reaction products, and in such a way that little or no free sulfuric acid is split off during the reaction. I may then partly or wholly neutralise the reaction product by treatment with a suitable base.

The following is an example of the preparation of my new therapeutically effective product.

*Example.*—First of all, desirably, I prepare in a particular manner the metacresolsulfonic acid to be used, conveniently by sulfonating the metacresol in a suitable vessel or flask, as follows:

2000 g. of pure metacresol are placed in the flask, and 1600 g. of 20% oleum (20% fuming sulfuric acid) are slowly added to the metacresol with stirring, and with cooling if the temperature rises beyond 100° C. (for the reaction is strongly exothermic). The oleum should be of suitable purity for the manufacture of medicinal products. After the addition of the oleum, the flask is heated in a water bath at about 98 to 100° C. for a period of several hours, desirably about six.

The crude sulfonated metacresol which results is then allowed to cool at room temperature, and is poured into an excess of water; and is freed from sulfuric acid by adding an amount of barium hydroxide just sufficient to react with the free sulfuric acid present in the solution of the sulfonated metacresol. To determine the amount of barium hydroxide to be so added, the amount of free sulfuric acid present in the sulfonated metacresol is previously determined by known analytical methods. The precipitate formed, of barium sulfate, is separated by filtration.

The filtrate, which is a dilute solution of metacresol sulfonic acid plus any unreacted metacresol, is then concentrated by evaporation under vacuum, care being taken that the temperature does not rise beyond about 70° C. During this concentration any excess unreacted metacresol distils off with the water vapor. The evaporation is preferably continued until the concentration of the metacresolsulfonic acid reaches about 60% to 65%, as determined by titration. While it is possible to carry this concentration of the metacresolsulfonic acid until the crystalline form of one of its hydrates is obtained, I desirably stop the evaporation not only definitely short of the formation of such crystals but also while there is a considerable amount of water present.

as there is at the 60–65% concentration, in order that that water may be present for the subsequent condensation procedure; for if materially less water is present the condensation products are too complex, and if materially more water is present the condensation products are not complex enough, to obtain the best therapeutic effect. About 4000 g. of a 60–65% sulfonated metacresol are obtained from 2000 g. of metacresol.

It is such a 60–65% aqueous solution of sulfonated metacresol, substantially free both from unreacted metacresol and from sulfuric acid, which I use for the condensation.

The 4000 g. (about 2.7 molecular proportions) of metacresolsulfonic acid solution which have been obtained, are placed in a suitable vessel and heated to between 50° to 60° C., preferably about 55° C. I then add 500 g. (about 1 molecular proportion) of a solution of formaldehyde of 10° Baumé. Since the reaction is exothermic, I prefer making the addition of formaldehyde solution gradually with stirring so that the temperature of the reaction mixture desirably remains between 50° and 65° C., with care that in any event the temperature does not rise above 70° C. Alternatively, the aqueous solution of formaldehyde is passed slowly into the purified metacresolsulfonic acid solution at ambient temperature. As the reaction between the acid and the formaldehyde is of an exothermic nature, an automatic increase in temperature is soon observed and the mixture is progressively heated. It is then merely necessary to regulate the addition of formaldehyde so that the temperature in the reaction bath does not exceed 70° C. The two methods of operation are possible but I prefer the first embodiment.

It is at this stage that the condensation occurs, to condense the sulfonated metacresol through the formaldehyde.

The reaction mixture is allowed to stand for at least one hour, and preferably at least two hours, and then sufficient distilled water is added to bring the liquid to any desired concentration; for which I find a concentration corresponding to 23° Baumé to be suitable. The solution may be filtered at once to remove any insoluble matter present; or it may be allowed to stand for a number of days, and then filtered to remove insoluble matter; and I prefer the latter procedure. After the insoluble matter has been separated by filtration, the clear filtrate may be further diluted, as to a concentration corresponding to 21° Baumé.

The product thus obtained may be used as such in the treatment of diseased tissue, such for example as in treating cervicitis. It may be used in the dilution indicated, or in either more concentrated or more dilute form; but I prefer that it be no more concentrated than 21° Baumé. Also, it may be mixed with other material, as in the form of suppositories or ointments.

Moreover, the aqueous acid solution of the product may be neutralised either wholly or in part by the addition of an inorganic or an organic base or of an aqueous solution of either such base, such for example as an hydroxide of alkali metal (for example, sodium) or of an alkaline earth metal, (for example calcium) or of ammonium, an aliphatic amine such as methylamine or diethylamine or for example monoethanolamine or triethanolamine or again a heterocyclic base, as for example, pyridine, quinoline, etc. By neutralisation, the ability of the condensation product to be absorbed by protein substance is reduced.

The temperature at which the condensation takes place and the proportion of water present in the metacresolsulfonic acid before the addition of the formaldehyde may be varied to a certain extent, provided the proportion of highly condensed components in the product is not less than 60% and there is no appreciable formation of free sulfuric acid. In the same way, the molecular proportion between the metacresolsulfonic acid and the formaldehyde is not necessarily that which I have indicated in the example (2.7:1) but may be varied between the molecular ratio of 2:1 and 3.5:1, always provided that the proportion of highly condensed components in the product is not less than 60%.

I claim:

1. A new therapeutic product for the treatment of diseased tissue, comprising a condensation product obtained by condensing an aqueous solution of substantially pure metacresolsulfonic acid of about 60–65% concentration with an aldehyde.

2. The process of making a therapeutic product for the treatment of diseased tissue, which consists in condensing about 2.7 molecular proportions of substantially pure metacresolsulfonic acid with one molecular proportion of formaldehyde in an aqueous medium.

3. The process of making a therapeutic product for the treatment of diseased tissue, which consists in condensing an aqueous solution of substantially pure metacresolsulfonic acid of about 60–65% concentration with formaldehyde.

4. The process of making a therapeutic product for the treatment of diseased tissue, which consists in condensing an aqueous solution of substantially pure metacresolsulfonic acid with formaldehyde, and maintaining the temperature of reaction during the condensation at not to exceed 70° C.

5. The process of making a therapeutic product for the treatment of diseased tissue, which consists in condensing an aqueous solution of substantially pure metacresolsulfonic acid with formaldehyde in the presence of a sufficient amount of water and at a temperature which produces a condensation product of which at least 60% is of sufficiently high molecular weight to react with protein to form insoluble reaction products.

6. The process of making a therapeutic product for the treatment of diseased tissue, which consists in condensing between 2.0 and 3.5 molecular proportions of substantially pure metacresolsulfonic acid with one molecular proportion of formaldehyde in an aqueous medium.

7. The reaction product of substantially pure metacresolsulfonic acid and an aldehyde.

8. The reaction product of one molecular equivalent of an aldehyde and 2.1 to 3.5 molecular equivalents of substantially pure metacresolsulfonic acid.

9. The reaction product of an aldehyde and substantially pure metacresolsulfonic acid, which reaction product contains at least 60% of complexes of sufficiently high molecular weight that they react with proteins to form insoluble substances.

10. The reaction product of substantially pure metacresolsulfonic acid and formaldehyde.

11. The reaction product of one molecular equivalent of formaldehyde and 2.1 to 3.5 molecular equivalents of substantially pure metacresolsulfonic acid.

12. The reaction product of formaldehyde and substantially pure metacresolsulfonic acid, which reaction product contains at least 60% of complexes of sufficiently high molecular weight that they react with proteins to form insoluble substances.

13. The reaction product of one molecular equivalent of formaldehyde and approximately 2.7 molecular equivalents of substantially pure metacresolsulfonic acid.

14. The process of making a therapeutic product for the treatment of diseased tissue, which consists in subjecting substantially pure metacresol to the action of sulfuric acid to form metacresolsulfonic acid, removing the unreacted sulfuric acid from said metacresolsulfonic acid and reacting 2.1 to 3.5 molecular equivalents of a 60 to 65% water solution of said metacresolsulfonic acid with one molecular equivalent of formaldehyde at a temperature not to exceed 70° centigrade.

URBAIN J. THUAU.